US007579060B2

(12) United States Patent
Sakai et al.

(10) Patent No.: US 7,579,060 B2
(45) Date of Patent: Aug. 25, 2009

(54) RELEASING MATERIAL AND RELEASE AGENT

(75) Inventors: Yuichi Sakai, Kawasaki (JP); Jun-ichi Yamamoto, Kawasaki (JP); Kazuo Hirano, Yokohama (JP)

(73) Assignee: Asahi Kasei Chemicals Corporation, Toyko (JP)

( * ) Notice: Subject to any disclaimer, the term of this patent is extended or adjusted under 35 U.S.C. 154(b) by 380 days.

(21) Appl. No.: 10/503,477

(22) PCT Filed: Feb. 4, 2003

(86) PCT No.: PCT/JP03/01129

§ 371 (c)(1),
(2), (4) Date: Aug. 4, 2004

(87) PCT Pub. No.: WO03/066327

PCT Pub. Date: Aug. 14, 2003

(65) Prior Publication Data
US 2005/0123704 A1 Jun. 9, 2005

(30) Foreign Application Priority Data
Feb. 4, 2002 (JP) .............................. 2002-026934

(51) Int. Cl.
*B32B 9/00* (2006.01)
*B32B 33/00* (2006.01)
*B29C 65/00* (2006.01)
(52) U.S. Cl. ................... 428/41.8; 428/40.1; 428/41.4; 156/60
(58) Field of Classification Search ............... 428/40.1, 428/41.8, 336, 447, 500, 537.5, 41.4; 525/100; 442/99; 427/387; 156/60
See application file for complete search history.

(56) References Cited
U.S. PATENT DOCUMENTS

| 4,288,497 A | * | 9/1981 | Tanaka et al. | 428/447 |
| 5,492,599 A | * | 2/1996 | Olson et al. | 162/137 |
| 5,728,469 A | * | 3/1998 | Mann et al. | 428/41.8 |

(Continued)

FOREIGN PATENT DOCUMENTS
EP 0882576 A1 12/1998

(Continued)

*Primary Examiner*—Patricia L Nordmeyer
(74) *Attorney, Agent, or Firm*—Birch, Stewart, Kolasch & Birch, LLP

(57) ABSTRACT

It is an object of the present invention to provide a release material and a release agent, which can be produced by directly coating onto a substrate without requiring the application of an undercoating material even when using a permeable substrate such as paper, which have excellent releasability even when the amount of silicone used is small, have a low change in peel strength over time, have a high residual adhesion ratio of an adhesive tape, seal and the like after release from a release material, and have writability or printability to a release surface.

A release material and a release agent are provided, wherein the release layer contains a neutralized resin obtained from a neutralization reaction of an emulsion copolymer of a monomer composition containing from 5 to 80 mass % of an unsaturated carboxylic acid monomer with a basic substance, and a silicone emulsion and/or a silicone dispersion.

30 Claims, 1 Drawing Sheet

U.S. PATENT DOCUMENTS

| | | | |
|---|---|---|---|
| 5,858,545 A * | 1/1999 | Everaerts et al. | 428/447 |
| 5,945,174 A | 8/1999 | Shaw et al. | |
| 6,607,690 B2 * | 8/2003 | Anahara et al. | 264/614 |
| 2003/0124313 A1 * | 7/2003 | Nagano et al. | 428/156 |

FOREIGN PATENT DOCUMENTS

| | | | |
|---|---|---|---|
| EP | 0920986 A1 | 6/1999 | |
| EP | 1040915 A1 | 10/2000 | |
| JP | 3-500060 A | 1/1991 | |
| JP | 4-370150 | * 12/1992 | |
| JP | 5-279995 A | 10/1993 | |
| JP | 11-170440 A | 6/1999 | |
| JP | 2001-2975 A | 1/2001 | |
| JP | 2001-225416 A | 8/2001 | |
| JP | 2001-225417 A | 8/2001 | |
| WO | WO-96/31571 A1 | 10/1996 | |

* cited by examiner

RELEASING MATERIAL AND RELEASE AGENT

TECHNICAL FIELD

The present invention relates to release materials such as release paper, release film, releasable cloth and the like, which are used in items such as adhesive tape and Kraft tape, and also used in items such as adhesive sheet boards and adhesive labels. Also, the present invention relates to a release agent used in the production thereof.

BACKGROUND ART

In the field of adhesive tape, Kraft tape, adhesive labels, adhesive seals, adhesive sheets and the like, release materials as represented by release paper are widely used. Such release materials can be produced using a method of directly coating a release agent solution consisting mainly of a solvent type, a non-solvent type or an emulsion type silicone resin onto a substrate such as paper. However, this method has the problem that the amount of silicone resin used is large, because in case that the substrate is permeable (for example, paper), the coating solution permeates into the substrate. To suppress permeation of the coating solution, it is currently mainstream to laminate the substrate with polyethylene, and coat a solvent-type silicone resin on top of that. However, in recent years the need to recycle paper for transformation into recycled paper has developed from the standpoint of resource and environmental concerns. To achieve that, it has become desirable to use a method that does not use a polyethylene laminate, which has low recoverability. Specifically, methods have been proposed in which in place of polyethylene a latex, such as SB latex or acrylic latex (JP-A-2001-2975), or a water-soluble resin, such as polyvinyl alcohol (JP-A-5-279995) is applied onto the substrate as an undercoating material, wherein the silicone resin is then applied. However, this method is not satisfactory in terms of performance and productivity. Another method that has been proposed directly applies a mixture of an aqueous emulsion and a silicone compound for hardening (JP-3-500060T); but this method has the drawbacks of insufficient releasability and increase of peel strength over time. Furthermore, for example, this method has the drawbacks that if the amount of silicone compound used is not increased, releasability is not exhibited.

Thus, the provision of a writable, printable release material has been desired wherein permanent ink, aqueous ink, an inkjet printer, a thermal-transfer printer and the like can be used on a release surface of Kraft tape, tack paper and the like. While methods that use a silicone resin as the release agent provide good releasability, their writing and printing properties are insufficient. On the other hand, while excellent writability and printability can be achieved when a non-silicone compound such as a compound containing long chain alkyl groups is used as the release agent, the releasability is insufficient. Until now there has not been a release material satisfying releasability together with writability and printability.

It is an object of the present invention to provide a release material, and a release agent used in the production thereof, which:

can be produced by directly coating onto a substrate without requiring the application of an undercoating material even when using a permeable substrate such as paper;

has excellent releasability even when the amount of silicone used is small;

has a low change in peel strength over time;

has a high residual adhesion ratio of an adhesive tape, seal and the like after release from a release material; and has a surface which is writable or printable.

DISCLOSURE OF THE INVENTION

The present inventors, as a result of various investigations to solve the above problem, accomplished the present invention by finding that the release material disclosed below, which comprises, in a release layer, a neutralized resin obtained from a specific emulsion copolymer, and a silicone emulsion and/or a silicone dispersion. That is, the present invention relates to:

(1) A release material comprising a substrate and a release layer on said substrate, wherein a surface portion of said release layer has a silicone layer having a thickness of from 1 to 100 nm.

(2) The release material according to item 1, wherein the silicone layer of the surface portion of said release layer has a thickness of from 1 to 50 nm.

(3) A release material comprising a substrate and a release layer on said substrate, wherein said release layer comprises a polymer having a carboxylate group and a silicone.

(4) A release material comprising a substrate and a release layer on said substrate, wherein said release layer is prepared using:

(A) a neutralized resin obtained from a neutralization reaction of an emulsion copolymer of a monomer composition containing from 5 to 80 mass % of an unsaturated carboxylic acid monomer with a basic substance; and (B) a silicone emulsion and/or a silicone dispersion.

(5) The release material according to item 4, wherein said (B) silicone emulsion and/or a silicone dispersion has a number average particle diameter of 200 nm or less as measured by dynamic light scattering.

(6) The release material according to any one of items 4-5, wherein the neutralized resin is water-soluble.

(7) The release material according to any one of items 4 to 6, wherein the unsaturated carboxylic acid monomer is acrylic acid and/or methacrylic acid.

(8) The release material according to any one of items 4 to 7, wherein the basic substance is ammonia.

(9) The release material according to any one of items 4 to 8, wherein the neutralized resin has a pH of from 3 to 13.

(10) The release material according to any one of items 4 to 9, wherein said release layer has a surface portion silicone layer having a thickness of from 1 to 100 nm.

(11) The release material according to item 10, wherein said release layer has a surface portion silicone layer having a thickness of from 1 to 50 nm.

(12) A release material comprising a substrate and a release layer on said substrate, wherein the surface silicon atomic concentration of said release layer as measured by an XPS (X-ray Photoelectron Spectroscope) is from 10 to 30 atom %.

(13) The release material according to any one of items 1 to 11, wherein the surface silicon atomic concentration of said release layer as measured by an XPS (X-ray Photoelectron Spectroscope) is from 10 to 30 atom %.

(14) The release material according to item 12 or 13, wherein the silicone content of the release layer is from 1 to 90 mass %.

(15) The release material according to item 14, wherein the silicone content of the release layer is from 1 to 50 mass %.

(16) A release material comprising a substrate and a release layer on said substrate, wherein the surface silicon atomic concentration of said release layer as measured by an XPS (X-ray Photoelectron Spectroscope) is at least 5 times greater than the average silicon atomic concentration of the release layer as calculated from the silicone content of said release layer.

(17) The release material according to any one of items 1 to 15, wherein the surface silicon atomic concentration of said release layer as measured by an XPS (X-ray Photoelectron Spectroscope) is at least 5 times greater than the average silicon atomic concentration of the release layer as calculated from the silicone content of said release layer.

(18) The release material according to item 16 or 17, wherein the average silicon atomic concentration of the release layer as calculated from the silicone content of said release layer is from 0.2 to 4 atom %.

(19) The release material according to any one of items 1 to 18, wherein the silicone in said release layer is a curable silicone.

(20) The release material according to any one of items 1 to 19, wherein the silicone in said release layer substantially comprises a cured material obtained from an Si—H group-containing silicone and a vinyl silicone.

(21) The release material according to any one of items 1 to 20, wherein the substrate is selected from the group consisting of paper, cloth, resin laminated paper, resin coated paper, a resin film, a resin tape and a resin sheet.

(22) The release material according to item 21, wherein the substrate is either paper or cloth.

(23) A release agent comprising a polymer having a carboxylate group and a silicone.

(24) The release agent according to item 23, wherein the silicone comprises a silicone in the state of a silicone emulsion and/or silicone dispersion.

(25) A release agent comprising:
(A) a neutralized resin obtained from a neutralization reaction of an emulsion copolymer of a monomer composition containing from 5 to 80 mass % of an unsaturated carboxylic acid monomer with a basic substance; and
(B) a silicone emulsion and/or a silicone dispersion.

(26) The release agent according to item 24 or 25, wherein said (B) silicone emulsion and/or a silicone dispersion has a number average particle diameter of 200 nm or less as measured by dynamic light scattering.

(27) The release material according to any one of items 23 to 26, wherein the silicone content is from 1 to 90 mass % based on the total solids content of the release agent.

(28) The release agent according to item 27, wherein the silicone content is from 1 to 50 mass % based on the total solids content of the release agent.

(29) The release agent according to any one of items 25 to 28, wherein the neutralized resin is water-soluble.

(30) The release agent according to any one of items 25 to 29, which is prepared by mixing:
(C) a release agent stock solution C, which comprises (c-1) a neutralized resin obtained from a neutralization reaction of an emulsion copolymer of a monomer composition containing from 5 to 80 mass % of an unsaturated carboxylic acid monomer with a basic substance; and (c-2) a silicone emulsion and/or a silicone dispersion containing vinyl silicone and a group VIII metal compound; with
(D) a release agent stock solution D, which comprises a silicone emulsion and/or a silicone dispersion containing a Si—H group-containing silicone.

(31) A method of producing a release material, comprising the steps of applying the release agent according to any one of items 23 to 30 onto a substrate and drying it.

(32) The method of producing a release material according to item 31, wherein said drying is carried out at a temperature of from 100 to 250° C.

(33) The method of producing a release material according to item 31 or 32, wherein the substrate is selected from the group consisting of paper, cloth, resin laminated paper, resin coated paper, a resin film, a resin tape and a resin sheet.

(34) The method of producing a release material according to item 33, wherein the substrate is either paper or cloth.

(35) An adhesive tape comprising a substrate, a release layer on one side of said substrate and an adhesive layer on the other side thereof, wherein said substrate and said release layer constitute the release material according to any one of items 1 to 22.

(36) A method of producing an adhesive tape, which tape comprises a substrate, a release layer on one side of said substrate and an adhesive layer on the other side thereof, wherein the release material comprising said release layer and said substrate are produced according to the production methods of a release material according to any one of items 31 to 34.

(37) The adhesive tape according to item 35 or the method of producing an adhesive tape according to item 36, wherein the adhesive layer is a water-soluble or water-dispersible adhesive, or an alkali-soluble or alkali-dispersible adhesive.

(38) An adhesive sheet comprising a release substrate; a release layer on said release substrate; and an adhesive layer and a surface substrate laminated on said release layer in that order, wherein said release layer and said release substrate constitute the release material according to any one of items 1 to 22.

(39) A method of producing an adhesive sheet, which sheet comprises a release substrate; a release layer on said release substrate; and an adhesive layer and a surface substrate laminated on said release layer in that order; wherein the release material comprising said release layer and said release substrate are produced according to the production methods of a release material according to any one of items 31 to 34.

BEST MODE FOR CARRYING OUT THE INVENTION

Figure 1:
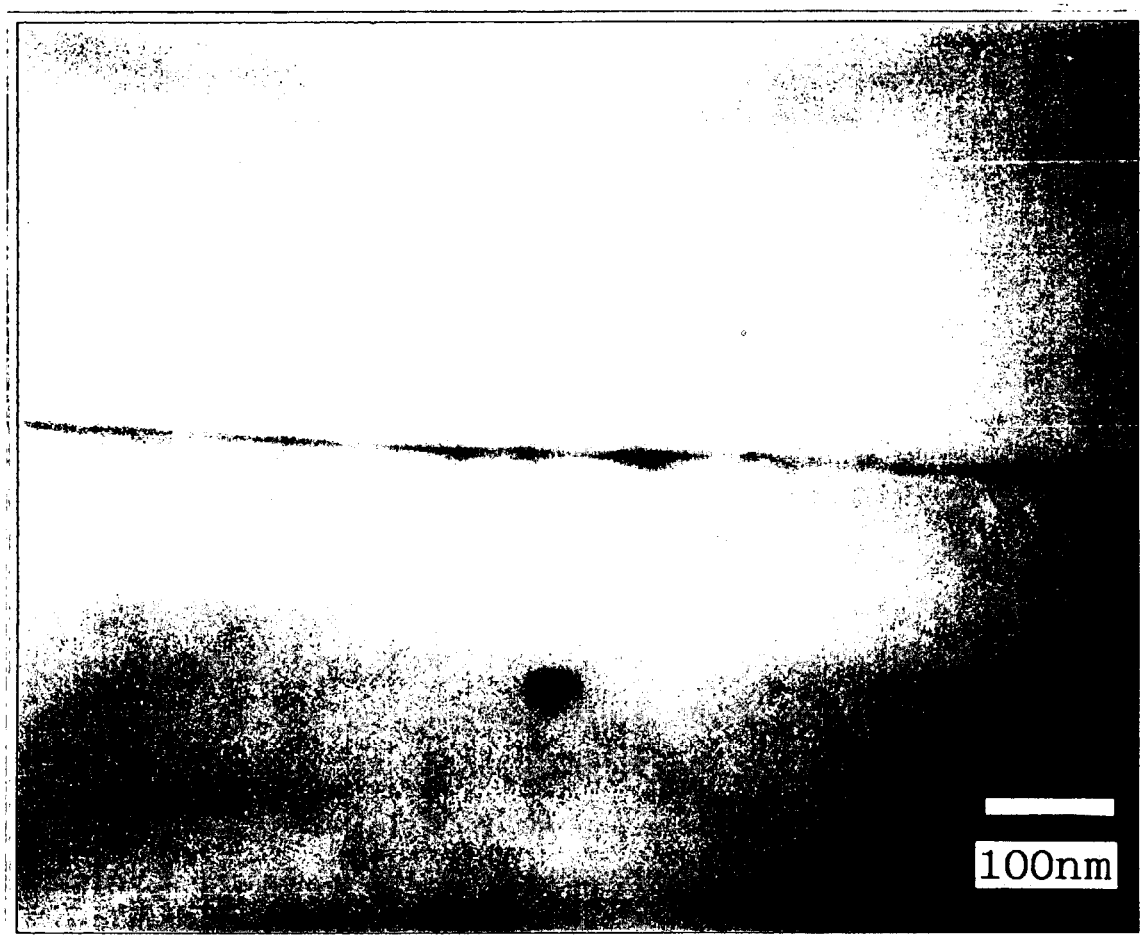
FIG. 1 is a transmission electron microscope photograph (magnified 250,000 times) of a release layer cross-section for a release test piece. The lower side of the middle is the release layer, wherein a silicone layer having an average thickness of 5 nm is present on the surface layer of the release layer.

The present invention will now be specifically explained.

In the present invention, a release layer is provided on a surface of the release material. The release layer according to the present invention can be provided directly on the substrate. Alternatively where appropriate a polyethylene laminate layer, an undercoating layer or etc. may be provided on the substrate and the release layer can be provided thereon. However, in terms of recycling efficiency and productivity, it is preferable to provide the release layer according to the present invention directly on the substrate.

The release material according to the present invention comprises a substrate and a release layer thereon. The surface layer portion of the release layer preferably comprises a silicone layer having a thickness of from 1 to 100 nm. More preferably the thickness of the silicone layer is from 1 to 50 nm and still more preferably from 1 to 20 nm. The thickness of the silicone layer is the average value as determined by a transmission electron microscope. The above range is preferable because when the thickness of the silicone layer is within such a range, releasability as well as writability and printability are good. According to the present invention, a release material in which the silicone layer is unevenly distributed or localized on such a release layer surface can be obtained.

The release layer of the release material according to the present invention may comprise a silicone constituent other than the silicone layer of the surface layer portion of the release layer. In such a case, it is preferable that a continuous layer of a polymer having a carboxylate group, which will be described below, is present in the layer of the surface portion other than the silicone layer. More preferable is a configuration in which the silicone is dispersed in the continuous layer.

When there is essentially no silicone contained in the layer of the surface portion other than the silicone layer, the amount of expensive silicone can be reduced, and the writability and printability are good, which is preferable.

The release material according to the present invention has preferably from 10 to 30 atom % of surface layer silicon atomic concentration of the release layer as measured by an XPS (X-ray Photoelectron Spectroscope), has more preferably from 10 to 25 atom %, and has still more preferably from 15 to 25 atom %. Especially preferable is from 22 to 25 atom %. When the surface layer silicon atomic concentration is within such a range, releasability as well as writability and printability are good.

In the present invention, the average silicon atomic concentration of the release layer as calculated from the silicone content ratio of the total solids content of the release layer is preferably from 0.2 to 4 atom %. The surface layer silicon atomic concentration as measured by an XPS (X-ray Photoelectron Spectroscope) is preferably at least 5 times greater than the average silicon atomic concentration of the release layer, and more preferably at least 10 times greater. When the concentration is within such a range, a release material can be obtained that is excellent in releasability as well as writability and printability even if the amount of silicone used is small. According to the present invention, even when the silicone content ratio of the total solids content of the release layer is low i.e., 1 to 20 by mass %, a release material having a surface layer silicon atomic concentration of 13 to 24 atom %, which is far greater than the average silicon atomic concentration of from 0.2 to 4 atom % in the release layer as calculated from said silicone content, can be obtained, and as a result releasability becomes good. Since a material having good releasability in the present invention can be obtained even if a small amount of expensive silicone is used, the economical efficiency is advantageous. Further, because of excellent writability and printability, the present invention is particularly superior to the conventional art.

The atom % which shows the silicon atomic concentration in the present invention represents the percentage of silicon atoms on the basis of the total of all of the number of atomic quantitative values having an atomic number greater than or equal to the atomic number of a carbon atom as measured by an XPS (X-ray Photoelectron Spectroscope). The XPS (X-ray Photoelectron Spectroscope) used for measuring irradiates X-rays at a test sample and then analyzes the kinetic energy of photoelectrons emitted from the surface. While there are no restrictions on the device that may be used as long as it can analyze the characteristics of the elements that are present on the sample surface layer (analysis depth: several nm), their amounts and their chemical states, an ESCALAB 250 made by Thermo VG can be shown as an example.

In the present invention, as to the release material which comprises a substrate and a release layer on the substrate, the release layer preferably comprises a polymer having a carboxylate group and a silicone. Compared with the use of a water-soluble resin such as polyvinyl alcohol, using a polymer having a carboxylate group achieves superior releasability, suppression of change with time, improved residual adherence, writability and printability on the release surface. While the polymer having a carboxylate group used in the present invention is not particularly restricted, a totally or partially neutralized polymer which contains a carboxylic acid group obtained by polymerizing a monomer composition which contains an unsaturated carboxylic acid monomer can be shown as an example.

In the present invention, as to the release material which comprises a substrate and a release layer on said substrate, the release layer is preferably the release material which comprises (A) a totally or partially neutralized product of a polymer having a carboxylic acid group, and (B) a silicone emulsion and/or silicone dispersion. In the present invention it is preferable to use a polymer in which some or all of the carboxylic acid groups of the polymer have been neutralized using a base. Compared with the use of a water-soluble resin such as polyvinyl alcohol, the use of a polymer neutralized product according to the present invention in the release agent layer can achieve superior releasability, suppression of change with time, improved residual adherence, writability and printability on the release surface. While the polymer having a carboxylic acid group used in the present invention is not particularly restricted, the emulsion copolymer of a monomer composition which contains an unsaturated carboxylic acid monomer can be shown as an example.

In the present invention, while the ratio of silicone content to the total solids content of the release layer is not particularly restricted, from 1 to 90 mass % is preferable. A silicone content of 1 mass % or more is preferable in terms of development releasability, 5 mass % or more is further preferable and 10 mass % or more is still further preferable. Also, a content of 90 mass % or less is economically preferable because the amount of expensive silicone used is lower, while a content of 50 mass % or less is more preferable in terms of writability and printability, 30 mass % or less is still more preferable and 20 mass % or less is especially preferable. The present invention is excellent in release properties with a lower silicone content as compared to the prior art, and is characterized in being superior in writability and printability. Also, the content of the polymer having a carboxylate group used in the present invention is preferably from 10 to 99 mass %. More preferable is 95 mass % or less and 90 mass % or less is still more preferable. A content of 10 mass % or more is preferable, more preferable is 50 mass % or more, 70 mass % or more is still more preferable and 80 mass % or more is especially preferable. When the content of the polymer having a carboxylate group is within such a range, releasability as well as writability and printability are good, and so is preferable.

The release agent according to the present invention comprises a polymer having a carboxylate group and silicone. The release agent according to the present invention can be preferably used to produce the release material according to the present invention.

The release agent according to the present invention preferably comprises a neutralized resin which can be obtained from the neutralization reaction of an emulsion copolymer of a monomer composition containing from 5 to 80 mass % of an unsaturated carboxylic acid monomer with a basic substance. By including a constituent derived from a specific neutralized resin in the release layer using the release agent superior releasability, suppression of change over time, improved residual adherence, and writability and printability on the release surface can be achieved.

The polymer having a carboxylate group used in the present invention preferably has from 5 to 80 mass % of a mass fraction of the unsaturated carboxylate monomer based on all the monomers used in polymerization, more preferably from 10 to 60 mass % and still more preferably from 15 to 50 mass %. The mass fraction of the unsaturated carboxylate monomer is preferably within this range because emulsion stability as well as water solubility and swelling property of the resin constituent obtained from the neutralization reaction of the emulsion are good. The polymer having a carboxylate group used in the present invention can be obtained, for example, by means of the total or partial neutralization of a product prepared from an unsaturated carboxylic acid monomer, and if necessary, a monomer composition containing other polymerizable monomers according to an ordinary emulsion polymerization method.

The emulsion copolymer used in the present invention (herein "emulsion copolymer" being referred to as copolymer in the state of emulsion) preferably has a mass fraction of the unsaturated carboxylic acid monomer based on all the monomers used in the polymerization of from 5 to 80 mass %, more preferably from 10 to 60 mass % and still more preferably from 15 to 50 mass %. When the mass fraction of the unsaturated carboxylic acid monomer is within this range, emulsion stability as well as water solubility and swelling property of the neutralized resin obtained from the neutralization reaction of the emulsion are good and so is preferable. The emulsion copolymer used in the present invention can be prepared according to an ordinary emulsion polymerization method from an unsaturated carboxylic acid monomer and optionally, a monomer composition containing other polymerizable monomers.

While the unsaturated carboxylic acid monomer used in the present invention is not particularly restricted as long as it has a carboxylic acid group and polymerizable double bonds, examples include an unsaturated monocarboxylic acid monomer such as acrylic acid and methacrylic acid; an unsaturated polycarboxylic acid monomer such as itaconic acid, fumaric acid and maleic acid; and an ester which maintains one or more of these carboxylic acid groups. From the standpoint of development of releasability and coating properties, acrylic acid or methacrylic acid is preferably used. These unsaturated carboxylic acid monomers can be used in a combination of two or more.

The polymer having a carboxylic acid group, the polymer having a carboxylate group and other polymerizable monomers used in the emulsion copolymer, all of which are used in the present invention, are not particularly restricted as long as they can copolymerize with the unsaturated carboxylic acid monomer. Examples thereof include vinyl acetate, styrene, α-methyl styrene, ethylene, isoprene, butadiene, vinyl chloride, acrylic esters such as methyl acrylate, ethyl acrylate, butyl acrylate, cyclohexyl acrylate, and 2-ethylhexyl acrylate, methacrylic esters, such as methyl methacrylate, ethyl methacrylate, butyl methacrylate, cyclohexyl methacrylate, 2-ethylhexyl methacrylate, amide derivatives such as acrylamide, acrylonitrile, and methacrylonitrile. From the standpoint of development of releasability and coating properties, acrylic ester and methacrylic ester are preferably used. These polymerizable monomers can be used singly or in combination.

While the glass transition point temperature for the polymer having a carboxylic acid group, the polymer having a carboxylate group and the emulsion copolymer, all of which are used in the present invention, is not particularly restricted, from the standpoint of coating properties such as coating strength and releasability, it is preferably from $-35°$ C. to $140°$ C. and more preferably from $-25°$ C. to $100°$ C.

The release agent according to the present invention contains a neutralized resin (A) which is obtainable by the neutralization of the emulsion copolymer with a basic substance. Although the emulsion copolymer emulsifies and disperses in water in particle form under acidic conditions of a pH of less than 3, it dissolves or swells in water, when the pH is raised by adding a basic substance. The neutralized resin used in the present invention is water-soluble or a substance that has water-swelling properties. The basic substance used in the present invention is not particularly restricted as long as it dissolves or swells the emulsion copolymer in water by the neutralization reaction of the unsaturated carboxylic acid moiety of the emulsion copolymer. Examples of the basic substance include metal hydroxides such as lithium hydroxide, sodium hydroxide and potassium hydroxide; fatty amine compounds such as ammonia, ethylamine, diethylamine, triethylamine, cyclohexylamine, allylamine, ethylenediamine, triethylenetetramine, and ethanol amine; and aromatic amines such as an aniline. From the standpoint of releasability, residual adhesion property and coating property, ammonia or fatty amine compounds are preferably used, and ammonia is especially preferably used. Releasability and residual adhesion can be improved by dissolving or swelling the emulsion copolymer in water using the basic substance. Preferable in terms of releasability and residual adhesion is the case where a basic substance is used to dissolve the emulsion copolymer in water, in other words, the case where the neutralized resin according to the present invention is water-soluble.

In the present invention, while the pH of the neutralized resin after the neutralization reaction of the emulsion copolymer with a basic substance is not particularly limited, from 3 to 13 is preferable, 5 to 12 is more preferable and 6 to 10 is still more preferable. The pH is preferably within this range because releasability, residual adhesion and water solubility and swelling property of the resin constituent obtained by the emulsion neutralization reaction are good. While the method of neutralization reaction in the present invention is not particularly limited, a method of adding and stirring an aqueous solution of a basic substance to the emulsion copolymer until the defined pH is reached can be shown as an example. The concentration of the aqueous solution of the basic substance to be added is not particularly restricted, but is preferably from 1 to 20 mass %, more preferably from 2 to 10 mass % in order to obtain a suitable release agent concentration and to avoid thickening and gelling due to localized neutralization reactions.

While the emulsion copolymer concentration in the release agent according to the present invention is not particularly limited, in order to obtain a suitable release agent viscosity, from 1 to 50 mass % is preferably used, and from 5 to 40 mass % is more preferably used.

The release agent according to the present invention preferably comprises (B) a silicone emulsion and/or a silicone dispersion. The release agent preferably comprises (B) a silicone emulsion and/or a silicone dispersion (when only one of them is used, this means the individual number average particle diameter, and when a mixture of them is used, this means the number average particle diameter of the mixture) having a number average particle diameter of 200 nm or less as measured by dynamic light scattering. By including a silicone compound in the release layer using the release agent, releasability can be developed. The silicone compound used in the release agent according to the present invention is preferably in an emulsion or dispersion state and preferably has a number average particle diameter for (B) the silicone emulsion and/or silicone dispersion as measured by dynamic light scattering of 200 nm or less. Further, the number average particle diameter for (B) the silicone emulsion and/or silicone dispersion is preferably from 1 to 200 nm. The number average particle diameter is preferably 200 nm or less because the peel strength becomes very low compared with the case when the particle diameter is large. The number average particle diameter is preferably 1 nm or more because preparation of (B) the silicone emulsion and/or silicone dispersion is made easy. The number average particle diameter is especially preferably from 1 to 100 nm because releasability is further improved. It is not clear why the peel strength gets smaller when the number average particle diameter is 200 nm or less, but it is conjectured that releasability improves because the silicone constituent tends to become localized on the surface during release layer formation when the number average particle diameter of the silicone emulsion and/or silicone dispersion is 200 nm or less.

The silicone emulsion used in the present invention is obtained by emulsifying a silicone compound in a solvent using a surfactant such as a nonionic type emulsifier. The silicone dispersion is obtained by dispersing a silicone compound in a solvent using modification due to a hydrophilic group and the like without the use of a surfactant.

While the silicone used as the silicone emulsion or silicone dispersion according to the present invention is not particularly limited, examples include silicone oils such as a Si—H group-containing silicone, dimethylpolysiloxane, methylphenyl polysiloxane, alkoxy group-containing silicone, silanol group-containing silicone, octamethylcyclotetrasiloxane, and decamethylcyclopentasiloxane; and modified silicones such as vinyl silicone, polyether modified silicone, polyglycerin modified silicone, amino modified silicone, epoxy modified silicone, mercapto modified silicone, methacrylic modified silicone, carboxylic-acid modified silicone, fatty-acid-ester modified silicone, alcoholic modified silicone, alkyl modified silicone, fluoroalkyl modified silicone and photopolymerizable functional group modified silicone. These silicones may be present individually, or two types or more may coexist together.

The silicone used in the present invention preferably is a curable silicone. Using a curable silicone improves releasability, allows the change in peel strength over time to be suppressed, and increases the residual adhesion ratio. The curable silicone is not particularly limited as long as it can cure by heat, ultraviolet rays, an electron beam and the like. Examples include addition type curing from a Si—H group-containing silicone and a vinyl silicone, condensation type curing from a Si—H group-containing silicone and a silanol group-containing silicone, and UV curing from a photopolymerizable functional group modified silicone. Especially, addition type curing from a Si—H group-containing silicone and a vinyl silicone is preferable from the point of curability. To promote the addition type curing reaction from a Si—H group-containing silicone and a vinyl silicone reaction, it is preferable to have a commonly known curing catalyst present. Using a group VIII metal as a catalyst for curing is especially preferable from the point of curing performance. The Si—H group-containing silicone used in the present invention is not particularly restricted, but polymethyl hydrogen siloxane is preferably used.

The group VIII metal compound used in the present invention is not particularly restricted. Examples include platinum group compounds, namely the compounds of ruthenium, rhodium, palladium, osmium, iridium and platinum are suitable, and in particular compounds of platinum and palladium are preferable. Examples of platinum compounds include platinum chloride (II), platinum chloride (IV), chloroplatinic acids such as tetrachloroplatinic acid (II) and hexachloroplatinic acid (IV), ammonium hexachloroplatinate (IV), potassium hexachloroplatinate (IV), platinum hydroxide (II), platinum dioxide (IV), dichloro-dicyclopentadienyl-platinum (II), a platinum-vinylsiloxane complex, a platinum-phosphine complex, a platinum-olefin complex, a chloroplatinic acid-olefin complex, elemental platinum and a material carrying solid platinum on alumina, silica or active carbon. Examples of the palladium compound include palladium (II) chloride, ammonium tetraammine-chloropalladate (II) and palladium (II) oxide. Among these, a chloroplatinic acid and a chloroplatinic acid-olefin complex can be more preferably used. The amount of group VIII metal compound used is usually from 5 to 1000 ppm of the total silicone amount.

To suppress catalytic activity of the addition curing reaction and extend the potlife of the release agent after mixing of the Si—H group-containing silicone and the vinyl silicone, a reaction inhibitor can be added to the release agent according to the present invention. Examples include organic nitrogen compounds such as a hydrazine or a triazole; organic phosphorous compounds such as a phosphine; organic sulfur compounds such as a mercaptan; and acetylene compounds such as an acetylene alcohol, cyclic methylvinylsiloxane and a siloxane modified acetylene alcohol.

While the ratio of the Si—H group-containing silicone to the vinyl silicone is not particularly restricted, usually it is from 0.5 to 10 of the ratio given by (number of Si—H mols)/(number of vinyl group mols). From a standpoint of curability, from 1.0 to 3.0 is preferably used. As an example of a silicone compound having such a ratio of (number of Si—H mols)/(number of vinyl group mols), silicone emulsions such as SLJ1519 A/B, DEHESIVE 400 E/V20, DEHESIVE 39005VP/39006VP made by the Wacker Asahi Kasei Silicone Co., Ltd. can be shown as examples.

In the present invention, the ratio of silicone content to the total solids content of the release agent is not particularly restricted, but is preferably from 1 to 90 mass %. A silicone content of 1 mass % or more is preferable from the point of releasability development, 5 mass % or more is more preferable and 10 mass % or more is still more preferable. In addition, a silicone content of 90 mass % or less is economically preferable because a lower amount of expensive silicone is used, while a content of 50 mass % or less is more preferable in terms of writability and printability expression, 30 mass % or less is still more preferable and 20 mass % or less is especially preferable. The present invention is characterized in being excellent in release properties while having a lower silicone content than the conventional art, and superior in writability and printability. Also, the polymer content having a carboxylate group used in the present invention is preferably from 10 to 99 mass %. More preferable is 95 mass % or less and 90 mass % or less is still more preferable. A content of 10 mass % or more is preferable, more preferable is 50 mass % or more, 70 mass % or more is still more preferable and 80 mass % or more is especially preferable. When the content of the polymer having a carboxylate group is within such a range, releasability as well as writability and printability are good, and therefore is preferable.

While the production method of the release agent according to the present invention is not particularly limited, a method in which the agent can be produced by, for example, mixing and stirring the silicone emulsion and/or silicone dispersion according to the present invention into the neutralized resin according to the present invention can be cited as an example. When the addition type curing reaction is conducted during the course of heating and drying using a Si—H group-containing silicone and vinyl silicone as the silicone emulsion and/or silicone dispersion, from the standpoint of shelf-life and stability of the release solution, it is preferable to, immediately before coating, mix the silicone emulsion and/or silicone dispersion comprising a Si—H group-containing silicone and the silicone emulsion and/or silicone dispersion comprising a vinyl silicone and a curing catalyst such as a platinum group compound, and then mix and stir by adding the liquid mixture to the neutralized resin according to the present invention for preparation. In terms of workability, it is preferable to prepare the release agent according to the present invention by mixing and stirring release stock solution C, obtained by (C) mixing and stirring the silicone emulsion and/or silicone dispersion comprising a vinyl silicone, the curing catalyst such as a platinum group compound and the neutralized resin according to the present invention, with release stock solution D, which comprises (D) the silicone emulsion and/or silicone dispersion comprising a Si—H group-containing silicone, just before coating. In the present invention, the mixing and stirring method is not particularly restricted, but it is preferable in terms of releasability development to uniformly disperse the silicone emulsion and/or silicone dispersion. The mixing style and mixing time are preferably selected so as to achieve uniform dispersion.

It is possible to use solvents other than water in the release agent according to the present invention for improving film formability and the like. While such solvents are not particularly restricted, examples include water-soluble solvents such as alcohols, for example, ethylene glycol monobutyl ether, propylene glycol monobutyl ether, 2,2,4-trimethyl-1,3-pentanediol monoisobutyrate, and benzyl alcohol; esters, for example, diethylene glycol monobutyl ether acetate; and ketones.

The release agent according to the present invention may comprise, as needed, a polymer emulsion such as SB latex and acrylic latex; a water-soluble resin such as polyvinyl alcohol, silanol modified polyvinyl alcohol, carboxyl modified polyvinyl alcohol, cation modified polyvinyl alcohol, acetoacetyl modified polyvinyl alcohol, acetal modified polyvinyl alcohol, polyvinyl pyrrolidone, polyacrylic acid, polyacrylate, polyacrylamide, starch, casein, gelatin, carboxymethyl cellulose and hydroxyethyl cellulose; a release control agent such as a polymer resin or an elastomer; pigments such as a cross linking agent, a silica, clay, and calcium carbonate; a lubricant; a silane coupling agent; a wetting agent; a defoaming agent; a thickener; a pigment dispersion agent, and an additive.

While the substrate used in the present invention is not particularly restricted, examples include permeable substrates, for example paper such as fine quality paper, Kraft paper, glassine and coated paper, cloth such as woven or non-woven fabric, timber, concrete, mortar, cement plate, brick, tile and stone; and non-permeable substrates, for example resin laminated paper such as polyethylene laminated paper, resin coated paper which has polyvinyl alcohol, starch, SB latex or the like coated on fine quality paper, resin films such as polypropylene and polyethylene terephthalate, resin tape, resin sheets, plastic plates, metal plates, and metallic foil. While all of these may be used, usually, paper, cloth, resin laminated paper, resin coated paper, resin film, resin tape and resin sheets are preferably used. When a permeable substrate, for example paper such as fine quality paper, Kraft paper, glassine paper, coated paper, or cloth such as woven or non-woven fabric, is used, it can be used without providing an undercoating layer. This substrate is especially preferable as releasability can be brought about with a lower amount of silicon than that in the conventional art. According to the present invention, release paper, adhesive sheets, tack paper, labels, stickers, emblems, delivery receipts, adhesive tape, Kraft tape, process paper and the like can be preferably produced.

While the surface substrate used for the adhesive sheet according to the present invention is not particularly restricted, examples include paper such as fine quality paper, coated paper, cast coated paper, thermosensitive paper and inkjet paper, cloth such as woven or non-woven fabric, resin films such as polyvinyl chloride, synthetic paper, polyethyleneterephthalate, polypropylene, polyethylene, cellulose triacetate, cellulose diacetate, polystyrene, polycarbonate, nylon, polyvinyl alcohol, ethylene-vinyl acetate copolymer and polyamide, porous resin films such as porous polypropylene film, metallized films such as PET or polyolefin having a metal such as aluminum deposited thereon and metal foil.

While the adhesive used for the adhesive layer in the adhesive tape or the adhesive sheet according to the present invention is not particularly restricted, examples include natural rubber adhesives, synthetic rubber adhesives such as a styrene-isoprene-styrene block copolymer, a styrene-ethylene-butadiene-styrene copolymer, a styrene-butadiene-styrene block copolymer, water and alkaline-insoluble types such as acrylic adhesives, and water-soluble or water-dispersible adhesives and alkali-soluble or alkali-dispersible adhesives excellent in solubility and dispersibility in the course of paper recycling. Of these, rather than being excellent in recycling efficiency, a water-soluble or water-dispersible adhesive, an alkali-soluble or alkali-dispersible adhesive is preferably used. Examples of a water-soluble or water-dispersible adhesive include acrylic acid-containing polymers such as polyvinyl alcohol, polyacrylamide, polyvinylmethylether, ethylacrylate-acrylic acid copolymer, dextrin and polyvinylpyrrolidone. Examples of alkali-soluble or alkali-dispersible adhesives include metal chelate crosslinked substances of the carboxyl group or hydroxyl group-containing monomer copolymers disclosed in JP-A-6-184508.

In the adhesive tape or adhesive sheet according to the present invention, as to the adhesive used on the adhesive layer, an adhesive resin, a softener, an antioxidant and a filler are also usually used in conjunction with each other. Examples of an adhesive resin include rosins, coumarone-indenes, terpenes, petroleum, styrenes, phenols and xylenes. Examples of a softener include polybutene, polyisobutylene, polyisoprene, process oil and naphthene oils. Examples of an antioxidant include phenols and amines. Examples of a filler include calcium carbonate and carbon black.

The release material according to the present invention can be produced by applying the release agent onto a substrate and drying it. The application method is not particularly restricted, and a size press, blade coater, air knife coater, roll coater, brush coater, curtain coater, bar coater, gravure coater, sprayer and the like can be used. The drying method and drying temperature are not particularly restricted; air drying, hot-air drying, ultraviolet radiation drying and the like can be cited as examples, wherein the drying temperature employed is preferably from 80 to 250° C., more preferably from 100 to 250° C. and especially preferable is from 120 to 200° C. A drying temperature within this range is preferable because releasability and productivity of the drying process are good. While the application amount is not particularly restricted, a silicone application amount of from 0.01 to 10 g/m² is preferable, 0.05 to 5 g/m² is more preferable and 0.1 to 1 g/m² is still more preferable. When the amount of silicone application is within this range, releasability is sufficient and the amount of silicone used is low, and so this amount is economically preferable. After application and drying, smoothness can be adjusted by a supercalender, a gloss calendar and the like.

While the application method for the adhesive used on the adhesive tape or adhesive sheet according to the present invention is not particularly restricted, a blade coater, air knife coater, roll coater, brush coater, bar coater, gravure coater, reverse coater, comma coater, kiss coater and the like can be used. While the amount of the adhesive agent is not particularly restricted, from 5 to 100 g/m² is preferably used and from 10 to 50 g/m² is more preferably used in view of the adhesive property and the fact that protrusion of the adhesion from the tape or sheet does not occur.

Hereinafter, the present invention will be explained based on an embodiment.

The transmission electron microscope photograph was taken using a transmission electron microscope H-7100 manufactured by Hitachi, Ltd. at an acceleration voltage of 75 kV to obtain a photograph of a release layer cross-section, wherein an ultra-thin section had been prepared using an ultra-microtome after embedding a test piece on an epoxy resin and curing.

The surface layer silicon atomic concentration of the release layer according to an XPS (X-ray Photoelectron Spectroscope) was measured using an ESCALAB 250 (takeoff angle of 90 degrees) made by Thermo VG.

Number average particle diameter according to dynamic light scattering was measured using a Microtrac UPA particle size analyzer manufactured by Leeds & Northrup.

Evaluation of the release material was carried out by sticking adhesive tape (Nitto Denko 31B, width 5 cm) on a test piece, wherein the initial peel strength was measured at a pulling direction of 180° and a pulling speed of 0.3 m/min using a pulling testing machine. The change in peel strength over time was measured in the same manner, after a test piece that had adhesive tape stuck thereto had been stored at 23° C., 50% RH for 14 days. The residual adhesion ratio was expressed as the percentage of a peel strength which was measured by sticking an adhesive tape of which the 14-day peel strength had been measured, to an aluminum sheet, based on a peel strength which was measured by sticking an unused adhesive tape to an aluminum sheet. The peel strength of the unused adhesive tape was 11.8 N/5 cm. Evaluation of writability was determined by writing on a test piece using a permanent marker, then wiping off with tissue paper and visually observing any writing traces. Evaluation of printability was determined by printing on a test piece using a commercially available inkjet printer (PM-950C manufactured by Epson Corp.), then wiping off with tissue paper and visually observing any printing traces. The evaluation standards are shown below.

(1) Releasability: Evaluated as shown below based on the initial peel strength.
 ○: 0≦(initial peel strength)≦0.20 N/5 cm
 Δ: 0.20<(initial peel strength)≦0.98 N/5 cm
 X: 0.98 N/5 cm<(initial peel strength)
(2) Change in peel strength over time: Evaluated as shown below based on the peel strength after 14 days.
 ○: 0≦(peel strength)≦0.20 N/5 cm
 Δ: 0.20<(peel strength)≦0.98 N/5 cm
 X: 0.98 N/5 cm<(peel strength)

(3) Residual adherence: Evaluated as shown below based on the residual adherence after 14 days.
 ○: 85%≦(residual adherence)≦100%
 Δ: 65%≦(residual adherence)<85%
 X: (residual adherence)<65%
(4) Writability: Evaluated based on writing traces from a permanent marker whose writing had been wiped off.
 ○: generally completely remaining
 Δ: partially remaining
 X: nothing remaining
(5) Printability: Evaluated based on print traces from an inkjet ink whose printing had been wiped off.
 ○: generally completely remaining
 Δ: partially remaining
 X: nothing remaining

EXAMPLE 1

To 100 parts by mass of acrylic latex (acrylic acid(2-ethylhexyl)/methyl methacrylate/methacrylic acid=60/15/25 mass ratio, solids content 30 mass %), 100 parts by mass of water was added, then 10 mass % aqueous ammonia was added while stirring to obtain an aqueous resin solution having a pH of 8.4. A silicone emulsion DEHESIVE 39005VP/39006VP (manufactured by Wacker Asahi Kasei Silicone Co., Ltd., number average particle diameter 440 nm, silicone constituent 50 mass %, a mixture of Si—H group-containing silicone, vinyl silicone and a platinum compound) was added to the aqueous resin solution so as to give a silicone content as shown in Table 1. Water was added to give a solids content concentration of 10%, then the solution was mixed and stirred to prepare a release agent solution. This release agent solution was applied to Kraft paper (82 g/m²) using a bar coater, then dried by a hot-air dryer at 140° C. for 5 minutes to obtain a release paper. After the obtained release paper had been left overnight at 20° C., 65% RH, the paper was cut into 6 cm width and 10 cm length pieces to obtain test pieces for evaluation. The total application amount was measured from the weight gain of the test pieces, wherein the silicone application amount was calculated using the silicone content. The evaluation results of the test pieces are shown in Table 1.

EXAMPLE 2

Test pieces were obtained in the same manner as those in Example 1, except for the silicon emulsion being changed to a silicon emulsion SLJ1519 A/B (manufactured by Wacker Asahi Kasei Silicone Co., Ltd., number average particle diameter 100 nm, silicone constituent 50 mass %, a mixture of Si—H group-containing silicone, vinyl silicone and a platinum compound). The evaluation results of the test pieces are shown in Table 1.

EXAMPLE 3

Test pieces were obtained in the same manner as those in Example 2, except for the alkaline used in the neutralization reaction being changed from 10 mass % aqueous ammonia to 10 mass % aqueous sodium hydroxide. The evaluation results of the test pieces are shown in Table 1.

EXAMPLE 4

Test pieces were obtained in the same manner as those in Example 1, except for the silicone emulsion being changed to a silicone emulsion DEHESIVE 400 E/V20 (manufactured by Wacker Asahi Kasei Silicone Co., Ltd., number average particle diameter 180 nm, silicone constituent 48 mass %, a mixture of Si—H group-containing silicone, vinyl silicone and a platinum compound). The evaluation results of the test pieces are shown in Table 1.

EXAMPLE 5

Test pieces were obtained in the same manner as those in Example 2, except for the composition of the acrylic latex being changed to acrylic acid(2-ethylhexyl)/methyl methacrylate/methacrylic acid=60/5/35 mass ratio. The evaluation results of the test pieces are shown in Table 1.

EXAMPLE 6

Test pieces were obtained in the same manner as those in Example 2, except for the composition of the acrylic latex being changed to acrylic acid(2-ethylhexyl)/methyl methacrylate/acrylic acid=60/15/25 mass ratio. The evaluation results of the test pieces are shown in Table 1.

COMPARATIVE EXAMPLE 1

Test pieces were obtained in the same manner as those in Example 1, except for acrylic latex being changed to SB latex (styrene/butadiene=41/56 mass % ratio, glass transition temperature 0° C., minimum film formation temperature 15° C., solid content 50 mass %), and the release agent solution being used as is, without neutralizing with aqueous ammonia. The evaluation results of the test pieces are shown in Table 1.

COMPARATIVE EXAMPLE 2

Test pieces were obtained in the same manner as those in Example 1, except for the acrylic latex being used as is, without neutralization with aqueous ammonia. The evaluation results of the test pieces are shown in Table 1.

EXAMPLES 7 to 10

To 100 parts by mass of acrylic latex (acrylic acid(2-ethylhexyl)/methyl methacrylate/methacrylic acid=60/5/35 mass ratio, solids content 30 mass %), 92 parts by mass of water was added, then 5 mass % aqueous ammonia was added while stirring to obtain a neutralized resin having a pH of 6.5. A silicone emulsion SLJ1519A/B mixture (manufactured by Wacker Asahi Kasei Silicone Co., Ltd., number average particle diameter 100 nm, silicone constituent 50 mass %, a mixture of Si—H group-containing silicone, vinyl silicone and a platinum compound) was added to the neutralized resin so as to give a silicone content as shown in Table 1. Water was added to give a solids content concentration of 15%, then the solution was mixed and stirred to prepare a release agent solution. This release agent solution was applied to Kraft paper (82 g/m$^2$) using a bar coater, then dried by a hot-air dryer at 140° C. for 5 minutes to give a release paper. After the obtained release paper had been left overnight at 23° C., 50% RH, the paper was cut into 6 cm width and 10 cm length pieces to obtain test pieces for evaluation. The total application amount was measured from the weight gain of the test pieces, wherein the calculated silicone application amount using the silicone content was 0.5 g/m$^2$. The evaluation results of the test pieces are shown in Table 2. A transmission electron microscope photograph of a test piece cross-section of Example 7 is shown in FIG. 1.

EXAMPLE 11

Test pieces were obtained in the same manner as those in Example 7, except for the silicon emulsion being changed to a silicon emulsion DEHESIVE 400 E/V20 (manufactured by Wacker Asahi Kasei Silicone Co., Ltd., number average particle diameter 180 nm, silicone constituent 48 mass %, a mixture of Si—H group-containing silicone, vinyl silicone and a platinum compound). The evaluation results of the test pieces are shown in Table 2.

EXAMPLE 12

Test pieces were obtained in the same manner as those in Example 7, except for the composition of the acrylic latex

TABLE 1

| | Composition/Application amount | | | Evaluation results | | |
|---|---|---|---|---|---|---|
| | Silicone number average particle diameter nm | Silicone content* mass % | Silicone application amount** g/m$^2$ | Releasability | Change in peel strength over time | Residual adhesion ratio |
| Example 1 | 440 | 20 | 1.4 | Δ | X | Δ |
| Example 2 | 100 | 10 | 0.5 | ○ | ○ | ○ |
| Example 3 | 100 | 20 | 1.3 | ○ | ○ | ○ |
| Example 3 | 100 | 10 | 0.5 | ○ | ○ | ○ |
| Example 4 | 180 | 10 | 0.5 | ○ | Δ | Δ |
| Example 5 | 100 | 10 | 0.4 | ○ | ○ | ○ |
| Example 6 | 100 | 10 | 0.5 | ○ | ○ | ○ |
| Comparative Example 1 | 440 | 10 | 3.0 | X | X | X |
| Comparative Example 2 | 440 | 10 | 0.7 | X | X | X |

*Silicone content = Silicone mass (g)/(Silicone mass(g) + resin mass(g)) × 100 (mass based on solid content)
**Silicone application amount = total application amount (g/m$^2$) × Silicone content (mass %)/100 being changed to acrylic acid(2-ethylhexyl)/methyl methacrylate/methacrylic acid=60/15/25 mass ratio. The evaluation results of the test pieces are shown in Table 2.

EXAMPLE 13

To 100 parts by mass of acrylic latex (acrylic acid(2-ethylhexyl)/methyl methacrylate/methacrylic acid=60/5/35 mass ratio, solids content 30 mass %) 92 parts by mass of water was added, then 5 mass % aqueous ammonia was added while stirring to obtain a neutralized resin having a pH of 6.5. A silicone emulsion SLJ1519B (manufactured by Wacker Asahi Kasei Silicone Co., Ltd., number average particle diameter 150 nm, silicone constituent 50 mass %, a mixture of vinyl silicone and a platinum compound) was added to the neutralized resin, and this solution was stirred and mixed to obtain a release stock solution having a silicone content of 5 mass % in solids content. This release stock solution was stored at 23° C. for 30 days, then added to a silicon emulsion SLJ1519A (manufactured by Wacker Asahi Kasei Silicone Co., Ltd., number average particle diameter 150 nm, silicone constituent 50 mass %, Si—H group-containing silicone) to give the silicone content as shown in Table 2. Water was added to give a solids content concentration of 15%, then the solution was mixed and stirred to prepare a release agent solution. This release agent solution was used to obtain test pieces in the same manner as those in Example 7. The evaluation results for these test pieces are shown in Table 2.

EXAMPLE 14

Test pieces were obtained in the same manner as those in Example 7, except for the drying temperature after application of the release agent solution to the Kraft paper being changed from 140° C. to 100° C. The evaluation results for these test pieces are shown in Table 2.

COMPARATIVE EXAMPLE 3

Test pieces having a silicone application amount of 0.5 g/m² were obtained in the same manner as those of Example 7, except that a substrate that was laminated (film thickness 15 microns) by melt extrusion of low-density polyethylene (manufactured by Asahi Kasei) onto Kraft paper was used as the release substrate, and that a mixture of an addition-reaction type silicone SD7220 and a curing catalyst SRX212CAT (manufactured by Dow Corning Toray Silicone Co., Ltd., toluene solution, silicone constituent 30 mass %) was used as the release agent solution. The evaluation results for these test pieces are shown in Table 2.

COMPARATIVE EXAMPLE 4

Test pieces having a silicone application amount of 0.5 g/m² were obtained in the same manner as those of Example 7, except that a long chain alkyl pendant type polymer—pyyrole 1010 (manufactured by Ipposha Oil Industries Co., Ltd., toluene solution) was used as the release agent solution. The evaluation results for these test pieces are shown in Table 2.

TABLE 2

| | Release layer composition | | Evaluation results | | | | |
|---|---|---|---|---|---|---|---|
| | Silicone content* mass % | Surface layer silicon atomic concentration atom % | Releasability | Change in peel strength over time | Residual adhesion ratio | Writability | Printability |
| Example 7 | 10 | 22 | ○ | ○ | ○ | ○ | ○ |
| Example 8 | 20 | 24 | ○ | ○ | ○ | ○ | ○ |
| Example 9 | 5 | 13 | Δ | Δ | Δ | ○ | ○ |
| Example 10 | 50 | 25 | ○ | ○ | ○ | Δ | Δ |
| Example 11 | 20 | 20 | ○ | ○ | ○ | ○ | ○ |
| Example 12 | 10 | 23 | ○ | ○ | ○ | ○ | ○ |
| Example 13 | 10 | 22 | ○ | ○ | ○ | ○ | ○ |
| Example 14 | 10 | 16 | ○ | Δ | Δ | ○ | ○ |
| Comparative Example 3 | 100 | 25 | ○ | ○ | ○ | X | X |
| Comparative Example 4 | — | 0 | X | X | X | ○ | ○ |

*Silicone content = silicone mass(g)/(silicone mass(g) + resin mass(g)) × 100 (mass being solid content standard)

INDUSTRIAL APPLICABILITY

The release material according to the present invention allows for production using direct coating onto a substrate without requiring the application of an undercoating material even when using a permeable substrate such as paper. This material has excellent releasability even when the amount of silicone used is small, has a low change in peel strength over time, has a high residual adhesion ratio for an adhesive tape, seal and the like after release from a release material, and is excellent in writability and printability to the release surface.

The invention claimed is:
1. A release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone; and wherein said silicone layer has a silicone layer having a thickness of from 1 to 100 nm.
2. The release material according to claim 1, wherein the silicone layer of the separate surface portion of said release layer has a thickness of from 1 to 50 nm.

3. The release material according to claim 1, wherein the surface silicon atomic concentration of said release layer as measured by an XPS (X-ray Photoelectron Spectroscope) is from 10 to 30 atom %.

4. The release material according to claim 1, wherein the surface silicon atomic concentration of said release layer as measured by an XPS (X-ray Photoelectron Spectroscope) is at least 5 times greater than the average silicon atomic concentration of the release layer as calculated from the silicone content of said release layer.

5. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance; and
(B) a silicone emulsion and/or a silicone dispersion; and
wherein the surface silicon atomic concentration of said release layer as measured by an XPS (X-ray Photoelectron Spectroscope) is from 10 to 30 atom %.

6. The release material according to any one of claims 5 or 3, wherein the silicone content of the release layer is from 1 to 90 mass %.

7. The release material according claim 6, wherein the silicone content of the release layer is from 1 to 50 mass %.

8. A release material comprising a substrate and a release layer on said substrate, wherein said release layer is prepared using a mixture of:
(A) a neutralized resin obtained from neutralization reaction of an emulsion copolymer of a monomer composition containing from 5 to 80 mass % of an unsaturated carboxylic acid monomer with a basic substance; and
(B) a silicone emulsion and/or a silicone dispersion,
wherein said release layer has a separate surface portion silicone layer having a thickness of from 1 to 100 nm.

9. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance; and
(B) a silicone emulsion and/or a silicone dispersion,
wherein said (B) silicone emulsion and/or a silicone dispersion has a number average particle diameter of 200 nm or less as measured by dynamic light scattering, and wherein said release layer has a separate surface portion silicone layer having a thickness of from 1 to 100 nm.

10. The release material according to any one of claims 8 or 9, wherein said release layer has a separate surface portion silicone layer having a thickness of from 1 to 50 nm.

11. An adhesive sheet comprising a release substrate; a release layer on said release substrate; and an adhesive layer and a surface substrate laminated on said release layer in that order, wherein said release layer and said release substrate constitute the release material according to claim 1.

12. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance; and
(B) a silicone emulsion and/or a silicone dispersion; and
a surface portion of said release layer comprising a separate layer consisting of said silicone, wherein said silicone layer has a thickness of from 1 to 100 nm.

13. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance; and
(B) a silicone emulsion and/or a silicone dispersion; and
a surface portion of said release layer comprising a separate layer consisting of said silicone, wherein said silicone layer has a thickness of from 1 to 50 nm.

14. A release agent comprising a release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone; and wherein said silicone layer has a silicone layer having a thickness of from 1 to 100 nm.

15. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance, wherein said neutralized resin contains from 5 to 80 mass % of a carboxylate group; and
(B) a silicone emulsion and/or a silicone dispersion; and
a surface portion of said release layer comprising a separate layer consisting of said silicone, wherein said silicone layer has a thickness of from 1 to 100 nm.

16. A release material comprising a substrate and a release layer on said substrate, wherein said release layer is prepared using a mixture of:
(A) a neutralized resin obtained from a neutralization reaction of an emulsion copolymer of a monomer composition containing from 5 to 80 mass % of an unsaturated carboxylic acid monomer with a basic substance, wherein said neutralized resin contains from 5 to 80 mass % of a carboxylate group; and
(B) a silicone emulsion and/or a silicone dispersion; and
a surface portion of said release layer comprising a separate layer consisting of said silicone, wherein said silicone layer has a thickness of from 1 to 50 nm.

17. An adhesive tape comprising a substrate, a release layer on one side of said substrate and an adhesive layer on the other side thereof, wherein said substrate and said release layer constitute the release material according to claim 1.

18. The adhesive tape according to claim 17 wherein the adhesive layer is a water-soluble or water-dispersible adhesive, or an alkali-soluble or alkali-dispersible adhesive.

19. A method of producing a release material, comprising the steps of applying a release agent onto a substrate and drying it, wherein the release agent comprises a mixture of a polymer having a carboxylate group and a silicone, and wherein the silicone comprises a silicone in the state of a silicone emulsion and/or silicone dispersion which has a number average particle diameter of 200 nm or less as measured by dynamic light scattering.

20. A method of producing a release material, comprising the steps of applying the release agent onto a substrate and drying it, wherein the release agent comprises a mixture of:

(A) a neutralized resin obtained from a neutralization reaction of an emulsion copolymer of a monomer composition containing from 5 to 80 mass % of an unsaturated carboxylic acid monomer with a basic substance; and (B) a silicone emulsion and/or a silicone dispersion.

21. A method of producing a release material, comprising the steps of applying a release agent according onto a substrate and drying it, wherein the release agent comprises:

a release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone; and wherein said silicone layer has a silicone layer having a thickness of from 1 to 100 nm.

22. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying a release agent according onto a substrate and drying it, wherein the release agent comprises a mixture of a polymer having a carboxylate group and a silicone, and wherein the silicone comprises a silicone in the state of a silicone emulsion and/or silicone dispersion which has a number average particle diameter of 200 nm or less as measured by dynamic light scattering.

23. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying the release agent onto a substrate and drying it, wherein the release agent comprises a mixture of:

(A) a neutralized resin obtained from a neutralization reaction of an emulsion copolymer of a monomer composition containing from 5 to 80 mass % of an unsaturated carboxylic acid monomer with a basic substance; and (B) a silicone emulsion and/or a silicone dispersion.

24. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying a release agent according onto a substrate and drying it, wherein the release agent comprises:

a release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone; and wherein said silicone layer has a silicone layer having a thickness of from 1 to 100 nm.

25. A method of producing an adhesive sheet, which comprises a release substrate; a release layer on said release substrate; and an adhesive layer and a surface substrate laminated on said release layer in that order; wherein the release material comprising said release layer and said release substrate are produced according to a method of producing a release material, comprising the steps of applying a release agent according onto a substrate and drying it, wherein the release agent comprises a mixture of a polymer having a carboxylate group and a silicone, and wherein the silicone comprises a silicone in the state of a silicone emulsion and/or silicone dispersion which has a number average particle diameter of 200 nm or less as measured by dynamic light scattering.

26. A method of producing an adhesive sheet, which comprises a release substrate; a release layer on said release substrate; and an adhesive layer and a surface substrate laminated on said release layer in that order; wherein the release material comprising said release layer and said release substrate are produced according to a method of producing a release material, comprising the steps of applying the release agent onto a substrate and drying it, wherein the release agent comprises a mixture of:

(A) a neutralized resin obtained from a neutralization reaction of an emulsion copolymer of a monomer composition containing from 5 to 80 mass % of an unsaturated carboxylic acid monomer with a basic substance; and (B) a silicone emulsion and/or a silicone dispersion.

27. A method of producing an adhesive sheet, which comprises a release substrate; a release layer on said release substrate; and an adhesive layer and a surface substrate laminated on said release layer in that order; wherein the release material comprising said release layer and said release substrate are produced according to a method of producing a release material, comprising the steps of applying a release agent according onto a substrate and drying it, wherein the release agent comprises:

a release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone; and wherein said silicone layer has a silicone layer having a thickness of from 1 to 100 nm.

28. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying a release agent according onto a substrate and drying it, wherein the release agent comprises a mixture of a polymer having a carboxylate group and a silicone, and wherein the silicone comprises a silicone in the state of a silicone emulsion and/or silicone dispersion which has a number average particle diameter of 200 nm or less as measured by dynamic light scattering;

wherein the adhesive layer is a water-soluble or water-dispersible adhesive, or an alkali-soluble or alkali-dispersible adhesive.

29. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying the release agent onto a substrate and drying it, wherein the release agent comprises a mixture of:

(A) a neutralized resin obtained from a neutralization reaction of an emulsion copolymer of a monomer composition containing from 5 to 80 mass % of an unsaturated carboxylic acid monomer with a basic substance; and (B) a silicone emulsion and/or a silicone dispersion;

wherein the adhesive layer is a water-soluble or water-dispersible adhesive, or an alkali-soluble or alkali-dispersible adhesive.

30. A method of producing an adhesive tape, which comprises a substrate, a release layer on one side of said substrate and an adhesive layer on the other side thereof, wherein the release material comprising said release layer and said substrate are produced according to a method of producing a release material, comprising the steps of applying a release agent according onto a substrate and drying it, wherein the release agent comprises:

a release material comprising a substrate and a release layer on said substrate; wherein said release layer comprises a mixture of a silicone and a polymer containing from 5 to 80 mass % of a carboxylate group; wherein a surface portion of said release layer comprises a separate layer consisting of said silicone, wherein said silicone layer has a silicone layer having a thickness of from 1 to 100 nm, and wherein the adhesive layer is a water-soluble or water-dispersible adhesive, or an alkali-soluble or alkali-dispersible adhesive.

* * * * *